June 8, 1926.　　　　　　　C. A. MICHEL　　　　　　　1,587,974

AUTOMOBILE HEADLIGHT

Filed Feb. 13, 1925　　　3 Sheets-Sheet 1

Inventor
C. A. Michel
By Hull Brock & West
Attys.

June 8, 1926.
C. A. MICHEL
1,587,974
AUTOMOBILE HEADLIGHT
Filed Feb. 13, 1925    3 Sheets-Sheet 2
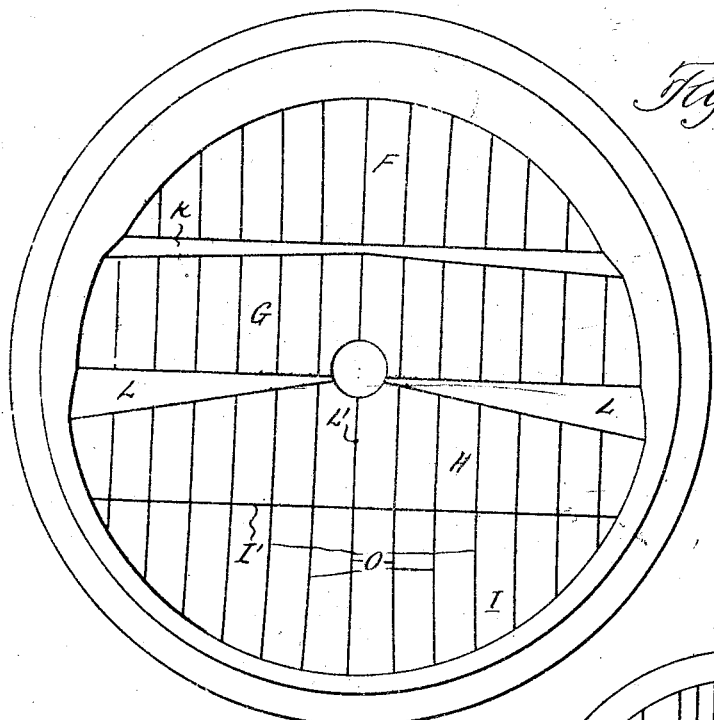
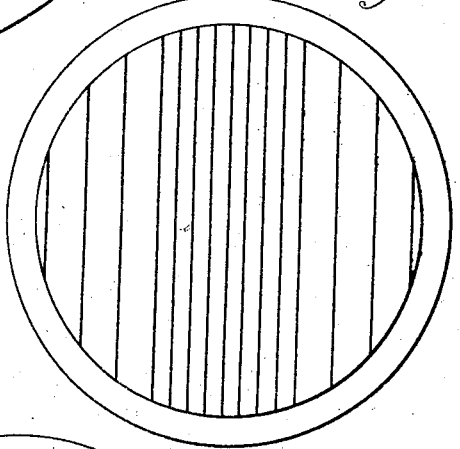
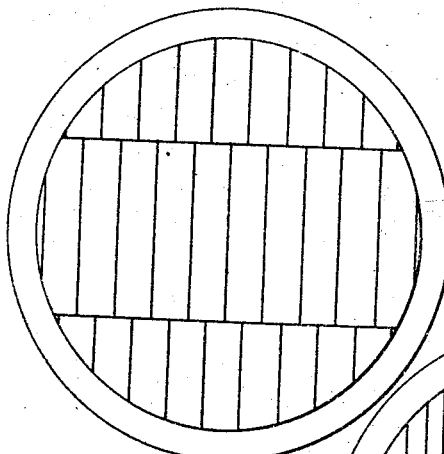
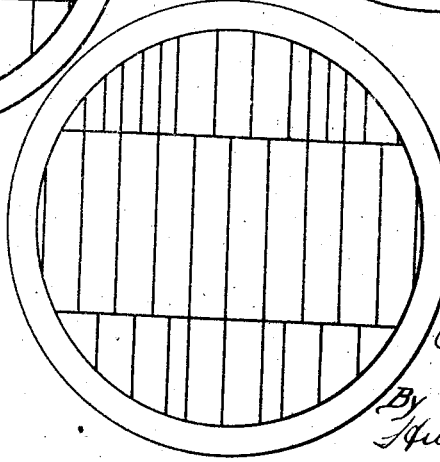

June 8, 1926.

C. A. MICHEL

AUTOMOBILE HEADLIGHT

Filed Feb. 13, 1925

1,587,974

3 Sheets-Sheet 2

Inventor
C. A. Michel
By Hull Brock & West
Attys.

Patented June 8, 1926.

1,587,974

UNITED STATES PATENT OFFICE.

CLARENCE A. MICHEL, OF CLEVELAND, OHIO, ASSIGNOR TO THE GUIDE MOTOR LAMP MANUFACTURING COMPANY, OF CLEVELAND, OHIO, A CORPORATION OF OHIO.

AUTOMOBILE HEADLIGHT.

Application filed February 13, 1925. Serial No. 8,880.

This invention relates generally to automobile headlights and more particularly to certain improvements pertaining to the lamp and reflector whereby the driving conditions are improved.

In most automobile headlights as at present constructed a single filament lamp is arranged centrally of the reflector and a single filament lamp usually of less candle power is arranged near the top of the reflector. The central lamp is used for road driving while the upper lamp is used for city driving and when passing other automobiles upon the road.

Furthermore, in automobile headlights as at present constructed it is common to employ a modified form of reflector or a modified form of lens with the idea of preventing the disagreeable glare when meeting other automobiles or pedestrians. These improvements are serviceable at times while there are other times due either to the unevenness of the road or the movement of the automobile that they are not serviceable.

The object of my invention is to add an element of safety to the present devices by employing a double filament lamp which is centrally arranged and in combination with a reflector so constructed that the top of the beam is projected forwardly within the legal limit a considerable distance in advance of the automobile for road driving while for city driving or while passing other automobiles the top of the beam can be materially deflected or drawn downwardly so as to avoid all possibility of glare. In order to further safeguard the matter I may use one of several types of refracting lenses in combination with the double filament lamp and modified reflector.

Figure 1:
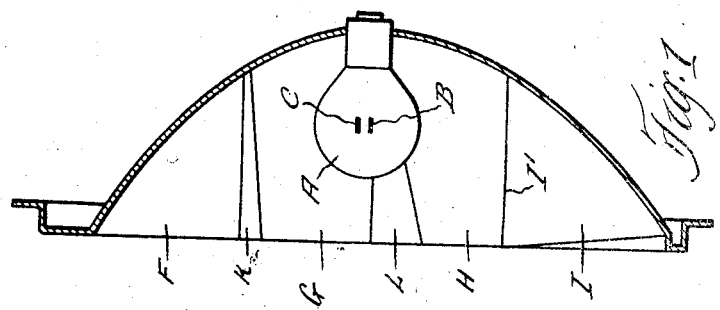
Figure 2:
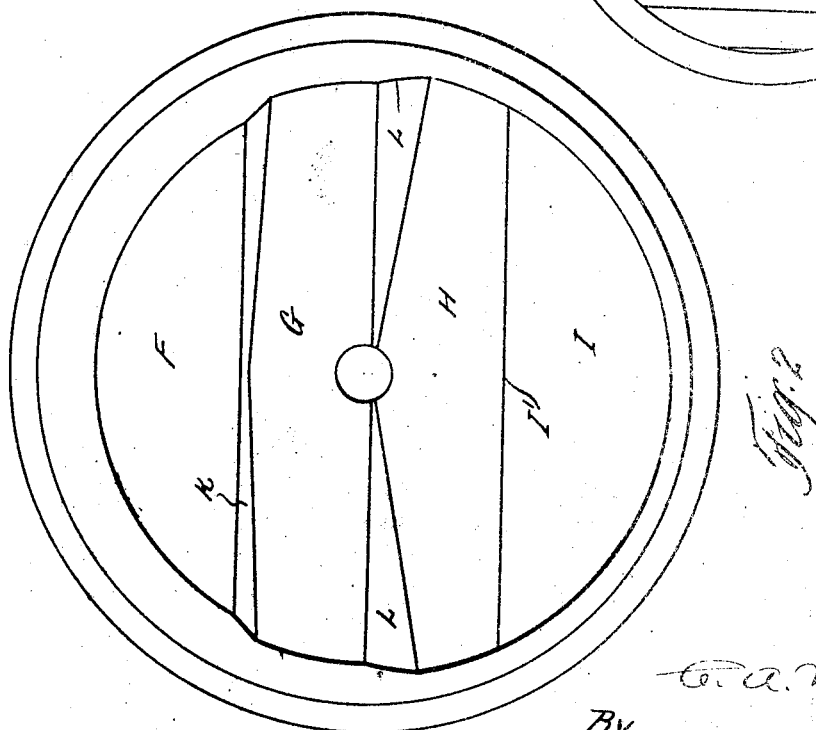
Figure 7:
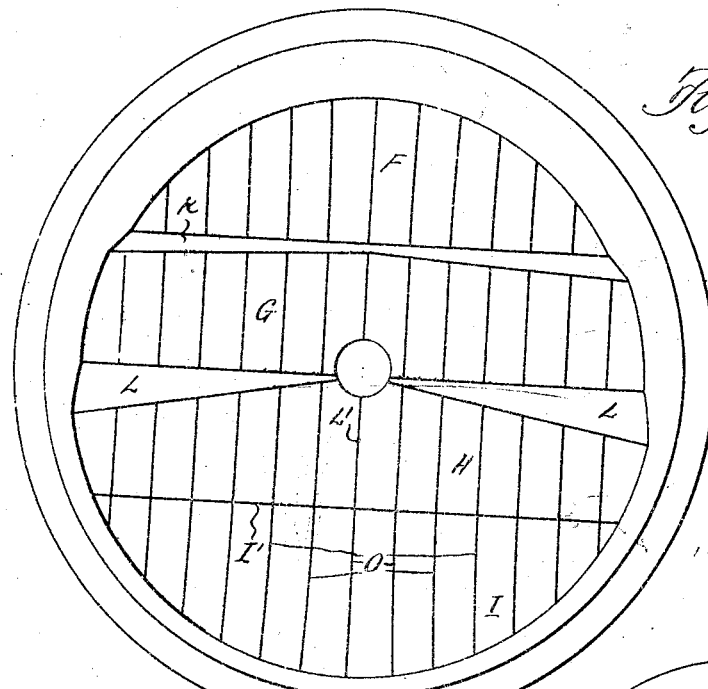

In the drawings forming a part of this specification I have shown means whereby the broad principle of my invention can be accomplished and in which Fig. 1 is a vertical sectional view of a reflector and lamp constructed in accordance with my invention; Fig. 2 is a face view of the reflector; Figs. 3, 4, 5 and 6 are face views of the different types of refractive lenses which can be used in connection with my improved reflector and double filament lamp; Fig. 7 is a face view of a slightly modified form of reflector capable of use in connection with a plain glass. Fig. 8 is a diagrammatic view upon a somewhat larger scale and showing the focal points and lines of direction.

In carrying out my invention I employ a lamp A, having two filaments B and C. The filament B is arranged substantially on the axis E of the reflector but very slightly above the same, probably to the extent of 40/1000 of an inch.

The filament C, is arranged above the filament B, approximately one-eighth of an inch.

The reflector is made from a single piece and comprises sections F, G, H, and I with transition surfaces K between the sections F and G, and transition surfaces L between the sections G and H. The sections F and G are of different focal lengths, the focal point F' of section F being located on the axis E of the reflector while the focal point G' of the section G is not only a short distance in advance of the point F' but it is also a very slight distance (say 40/1000th of an inch) above the axis E, and the axis of the section G is tilted downwardly about one degree, as indicated by the line G''. The focal point H' of section H is in advance of both points F' and G' and is on the axis E. The section I is a paraboloid of revolution of the same curvature as section H, but this section I is rotated downwardly about two degrees as indicated by the line I'.

The filaments B and C are between the points F' and H'.

A ray of light $G^3$ emanating from the point G' and striking the section G would be reflected horizontally and as section G is tilted down one degree this ray would in practice be directed downwardly also as indicated at $G^4$. A ray from G' striking the section F would also be directed downwardly and likewise rays emanating from G'. and striking the sections H and I would be reflected below the horizontal. A ray of light $H^2$ emanating from H', and striking H would be reflected horizontally and ray $H^3$, emanating from H' and striking I would be reflected slightly below the horizontal. Rays emanating from H' and striking F and G would be reflected slightly below the horizontal and as filament B is very slightly above the axis E and filament C is above B and both are between the focal points F' and H', it is obvious that all the rays emanating from filaments B are directed slightly below the horizontal and that rays emanating from the filament C will be directed still further below the horizontal. The filaments B and C are of substantially the same candle power, and the lower filament B is employed for ordinary road driving while the upper filament C is employed for city driving and while passing vehicles on the road inasmuch as the beam from the upper filament is directed farther below the horizontal than the beam from the filament B. In order to facilitate the manufacture of the reflector, embodying the sections F, G, H and I, without the employment of intersecting angles, I provide transition surfaces K and L respectively, when the sections F and G and G and H intersect.

Where there are reflecting surfaces of different curvatures of revolution, sharp angles are produced at their intersection and these angles not only introduce errors in the reflecting surfaces but also render the manufacture of the reflector very difficult, and to overcome these objections, I interpose the transition surfaces K and L as above described.

Figure 3:
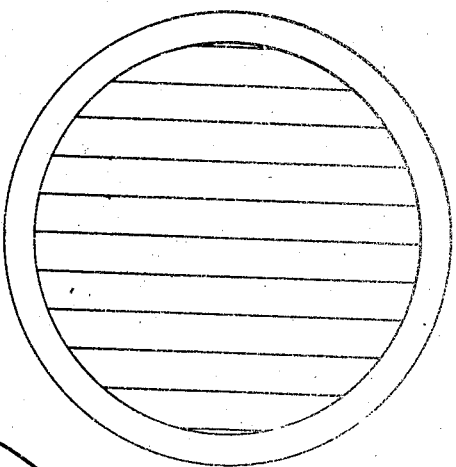
Figure 5:
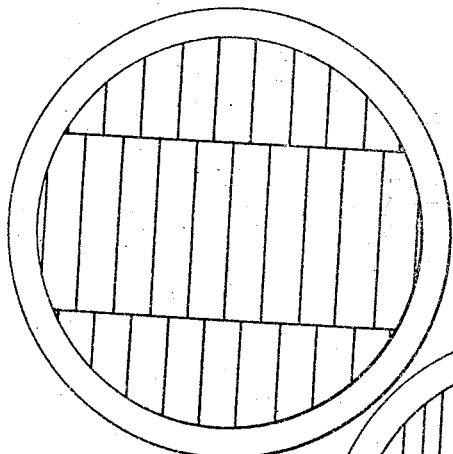
Figure 4:
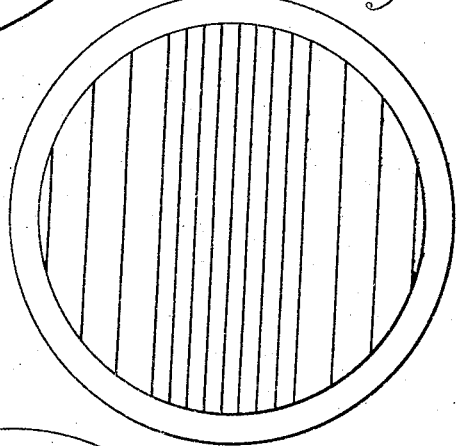
Figure 6:
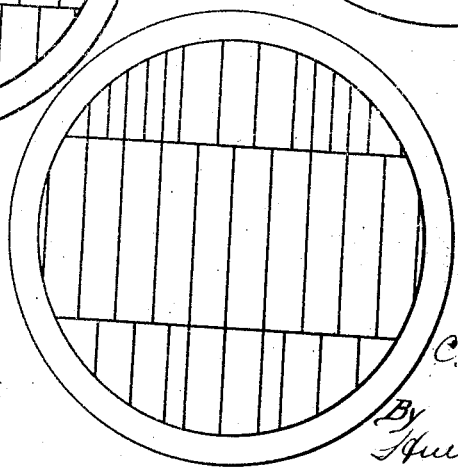

In connection with this form of reflector and double filament lamp I may employ a fluted lens and this lens can be of the uniform and continuous fluted type shown in Fig. 3, the continuous and non-uniform type of flute shown in Fig. 4, the uniform size of flute but not continuous as indicated in Fig. 5, or the type shown in Fig. 6 which is both non-continuous and non-uniform.

The reflector in combination with the double filament lamp arranged as previously described will give the proper direction to the beam so far as the vertical control thereof is concerned and the refractive screen constructed in accordance with any one of the figures will take care of the lateral distribution. Instead of employing the refractive screen I can provide a reflector having the flutes O as most clearly shown in Fig. 7 and when a reflector of this type is employed a plain glass lens can be employed as the lateral spread will be had from the fluted reflector. These flutes O are produced in the sections F, G, H and I and are substantially continuous, being interrupted only by the transition surfaces K and L which are not fluted.

It will thus be seen that I provide a novel form of reflector for use in connection with a double filament lamp and which can be made fluted and used with a plain lens or it can be made devoid of flutes and used in combination with any one of the various types of refractive screens herein shown and described.

Having thus described my invention, what I claim is:—

1. In a light projector, the combination with a reflector and a light bulb having two independently lighted filaments, one above the other, the lower one very slightly above the axis of the reflector, the focal point of the rear portion of the upper half of the reflector being in advance of the focal point of the forward portion of the upper half and also above the same, said rear portion of the upper half having its axis inclined slightly downwardly, the focal point of the lower half of the reflector being spaced from and in advance of the focal points of the upper half of the reflector, the filaments being located between the two forward focal points, the forward portion of the lower half of the reflector being inclined downwardly, whereby rays of light from either filament will be directed below the horizontal.

2. In a light projector, the combination with a reflector, of a light bulb having two independently lighted filaments one above the other, the lower one very slightly above the axis of the reflector, said reflector having sections F, G, H and I, the section G having a focal point in advance of and above the focal point of the section F, the sections H and I having a focal point upon the axis of the reflector in advance of the focal points of the upper half of the reflector, said section I being inclined downwardly, the filaments being located between the focal point for the lower half of the reflector and the focal point for the section G so that the rays of light from either filament will be directed below the horizontal.

3. In a light projector, the combination with a reflector of a light bulb having two independently lighted filaments, one above the other, the lower filament being substantially on the axis of the reflector but very slightly above the same, the reflector being composed of sections directed from three focal points, two of which are on the axis of the reflector, and one slightly above, the elevated focal point being located between the focal points upon the axis, the focal point of the lower half of the reflector being spaced from and in advance of the focal point of the forward portion of upper half of reflector, the filaments being located between the two forward focal points and the forward portion of the lower half of reflector being inclined downwardly, so that all rays from either filament will be directed below the horizontal.

4. In a light projector, the combination with a reflector of a light bulb having two independently lighted filaments, the forward portion of the upper half of the reflector having a focal point on the axis of the reflector, the focal point of the rear portion of upper half of the reflector being spaced above and in advance of the focal point of said forward portion, the focal point of the lower half of reflector being located on the axis and in advance of the elevated point, the forward portion of lower half being inclined downwardly, the filaments being located between the forward focal points whereby rays from either filament will be directed below the horizontal.

5. In a light projector, the combination with a reflector comprising the sections F, G, H and I, of a light bulb having two independently lighted filaments, and a refractive glass, arranged in advance of said reflector and provided with flutes to laterally refract the rays of light; the section G of the reflector having a focal point in advance of and slightly above the focal point of section F, which is on the axis of the reflector, the focal point of sections H and I being also on the axis of reflector and in advance of the other focal points, the section I being inclined downwardly, the filaments being located between the two focal points.

In testimony whereof, I hereunto affix my signature.

CLARENCE A. MICHEL.